Aug. 9, 1960    H. W. BOYD    2,948,833
ELECTRICAL SWITCHING APPARATUS
Filed May 4, 1956
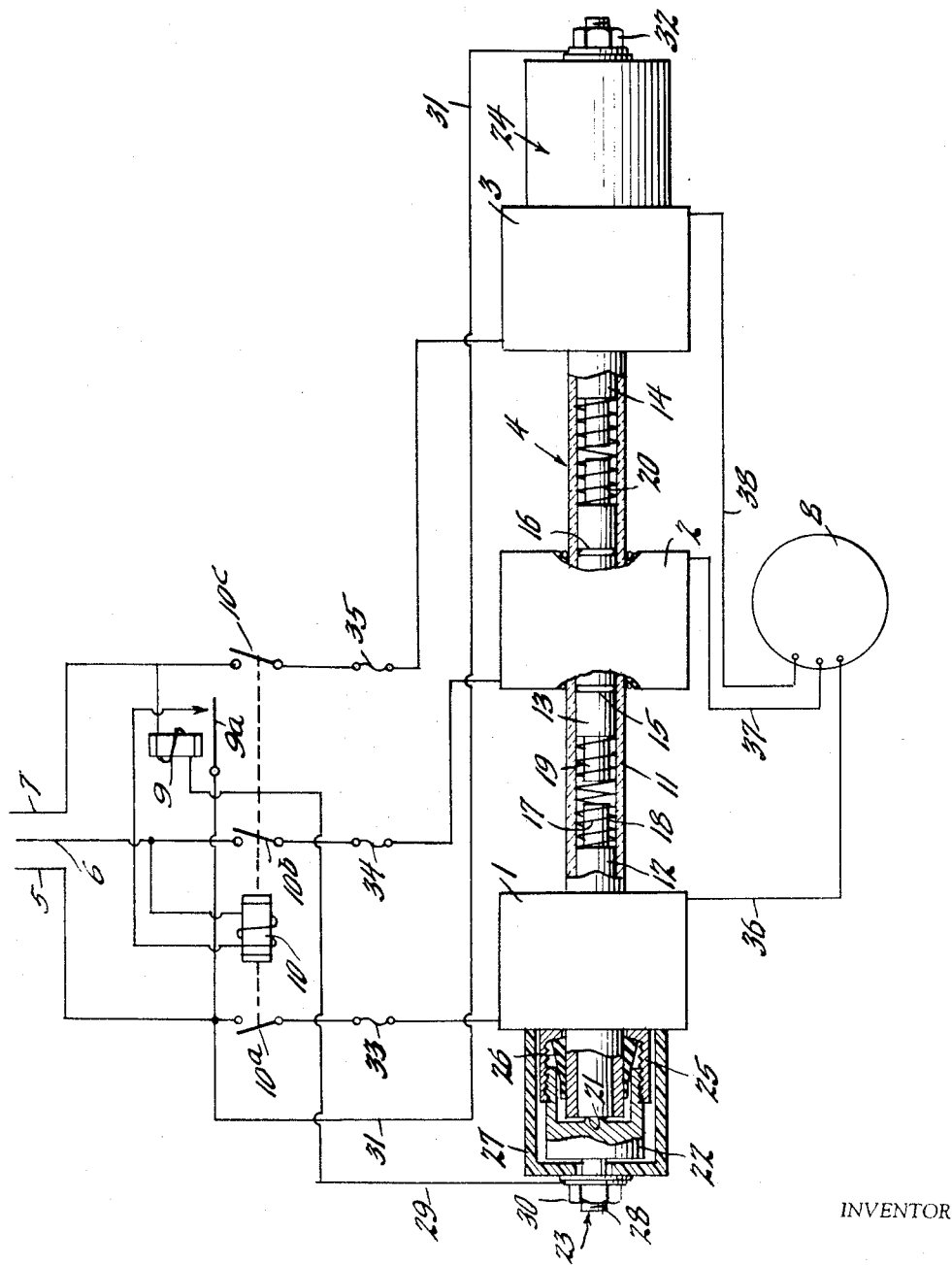
INVENTOR
HARVEY BOYD
BY
Watson, Cole, Grindle & Watson
ATTORNEYS

2,948,833

ELECTRICAL SWITCHING APPARATUS

Harvey W. Boyd, Midland, Tex., assignor to The Superior Oil Company, Midland, Tex., a corporation of California Filed May 4, 1956, Ser. No. 582,819

8 Claims. (Cl. 317—46)

This invention relates to electrical switching apparatus operative in response to failure of a single electrical supply line out of a group of lines. A preferred application of the principles of this invention contemplates a new and improved electromagnetic relay adapted for connection to the distribution lines of a polyphase system and actuatable in response to failure of one or more of the lines. This relay operation effects the removal of all line potentials from the polyphase load which would otherwise be applied from the undisturbed line conductors, thereby avoiding possible damage to the load.

A principal object of the invention is to provide an improved electromagnetic relay for polyphase load protection arrangements in which the relay is operative in response to current flow therethrough and not responsive to the application of voltage alone. It can be readily appreciated that a structure which is exclusively current responsive is not subject to false relay operation due to the application of counter-electromotive potentials generated by the load motor or the like. In many instances these voltages can cause the effective failure of a voltage-responsive protective circuit inasmuch as these voltages are capable of simulation of the application of line potential under circumstances where single phasing exists.

Another object of the invention is to provide an improved electromagnetic relay for polyphase load protection circuits operative to reconnect the load to the distribution lines as soon as line potential is re-established with respect to all phase conductors. The attainment of this object eliminates the necessity for the manual operation of a circuit breaker or the like. Accordingly, the re-energization of the load is established as soon as possible thereby enabling the load device to perform its intended functions, which in certain instances is a matter of extreme importance.

Another object of this invention is to provide an electromagnetic relay which is reliably operative in response to the failure of its single phase of a polyphase distribution system and which may be readily manufactured by economical technics.

Another object is to provide an improved electromagnetic relay operable in response to the current conditions in a plurality of lines.

A preferred embodiment of the electromagnetic relay of this invention adapted for use in a three-phase load protection arrangement features a relatively long tube fabricated of insulating material and having three axially-aligned magnetic cores disposed within the bore of the tube. The central core is rigidly fixed relative to the tube, and the outside cores are movable relative the central core. A helical metallic spring is positioned between the adjacent ends of each of the core pairs in such a manner that contacts associated with both of the terminal core ends are connected one to the other in the event that neither of the springs is contracted. This connection is a serial connection including the length of each core and the sandwiched springs, the terminal ends of which are welded to the associated core end.

A current coil is individually coupled to each of the coils, and these coils are appropriately connected to a three-phase power line in such a manner that adjacent ends of the cores repulse each other electromagnetically, thereby maintaining the aforementioned through circuit established between end contacts.

In the event, however, that one of the current coils is de-energized, the associated core is attracted to the next adjacent core in opposition to the intervening spring thereby disconnecting the end contacts one from the other and operating a pair of circuit controller relays so as to remove all power from the load.

After the circuit controller has removed all power from the load, the line coils are de-energized thereby permitting the springs sandwiched between the relay cores to force the terminal cores outwardly thereby partially enabling the circuit controller so that the re-establishment of a three-phase energy condition will immediately energize the load without the necessity for manual actuation of a switch or the like.

In order that all of the features for attaining the objects of this invention may be readily understood, reference is herein made to the drawing wherein a longitudinal partial sectional view of the preferred relay embodiment of this invention is shown connected in a three-phase power distribution system in such a manner as to protect a motor load in response to line failure.

Referring now to the drawing, the coils 1, 2 and 3 of electromagnetic relay 4 are connected to three-phase line conductors 5, 6 and 7 in such a manner that current drawn by polyphase motor 8 flows through these windings. Electromagnetic relay 4, auxiliary or time delay relay 9, and main contactor relay 10 are so interconnected with respect to one another that the occurrence of a single phasing condition due to line failure removes all power from the motor 8 in a manner hereinafter set forth in detail.

Coils 1, 2 and 3 of electromagnetic relay 4 are mounted on a relatively long glass tube 11. Three axially aligned magnetic cores 12, 13 and 14 are disposed within the bore of tube 11 in such a manner that the central portion of each core is individually enveloped by a different associated coil 1, 2 or 3.

Central core 13 is immovably fixed with respect to tube 4 by means of rubber O rings 15 and 16, whereas terminal cores 12 and 14 are slidably movable within the bore of tube 11 inasmuch as they are not retained in place by means of rings or the like.

Helical metallic spring 17 is positioned over the shouldered end portions 18 and 19 of cores 12 and 13, respectively. A corresponding arrangement employing a spring 20 is provided between central core 13 and terminal core 14. The terminal ends of each of springs 17 and 20 are spot welded to the associated cores whereby a through electrical circuit is established between core 12 and core 14 at all times.

Under certain circuit conditions hereinafter described in detail, springs 17 and 20 force cores 12 and 14 outwardly as is shown in the drawing whereby the left terminal end of core 12 establishes electrical contact with contact 21 formed on metal piece 22 which is part of the end contact and sealing assembly 23. Core 14 cooperates in a corresponding manner with an end contact which is part of end contact and sealing assembly 24 located at the opposite terminal end of electromagnetic relay 4. The sealing assemblies 23 and 24 seal the open terminal ends of the bore of tube 4 whereby the components contained within this bore may be immersed within a suitable insulating oil.

End contact and sealing assembly 23 comprises two threaded non-magnetic metal pieces 22 and 25 coupled one to the other in such a manner that rubber gasket 26 may be compressed therebetween forming a liquid seal at the left terminal end of tube 11. In view of the fact that metal pieces 22 and 25 are elevated to line potential during system operation, a cup-shaped plastic insulator 27 preferably envelops these components thereby reducing shock hazard to maintenance and installing personnel. A threaded shaft 28 is formed on metal piece 22. This shaft projects through an end opening in insulator 27 whereby a conductor 29 may be fixedly connected to metal piece 22 by the suitable tightening of nut 30.

End contact and sealing assembly 24 is identical in structural detail to the arrangement of assembly 23. Conductor 31 is fixedly secured to this assembly by means of nut 32. In the positioning of components shown in the drawing, conductors 29 and 31 are electrically connected to one another by a serial connection of components including shaft 28, metal piece 22, contact 21, core 12, spring 17, core 13, spring 20 and core 14 through assembly 24 back to conductor 31.

The polyphase line potential appearing at conductors 5, 6 and 7 is applied to the input terminals of windings 1, 2 and 3 through main contacts 10a, 10b and 10c which are mechanically ganged one to the other and actuated in response to the energization of main contactor winding 10. Each of lines 5, 6 and 7 is protectively fused by means of fuses 33, 34 and 35, respectively. The output terminal conductors 36, 37 and 38 of windings 1, 2 and 3, respectively, are connected to load motor 8 in such a manner that the current flowing through each phase conductor flows through the associated winding thereby energizing that winding.

Time delay relay 9 is energized by a potential applied from line conductors 5 and 7 through a circuit starting from conductor 7 including the winding of relay 9, conductor 29, shaft 28, metal piece 22, contact 21, core 12, spring 17, core 13, spring 20, core 14, contact assembly 24 and conductor 31, back to line 5. Normally open contact 9a is actuated in response to the energization of relay 9 thereby establishing a circuit for energizing contactor relay 10 by line potential applied from line conductors 5 and 6.

The detailed operation of the foregoing structure is as follows: Assuming that all circuits are de-energized, the relays 4, 9 and 10 and associated contacts assume the positions shown in the drawing. The application of a three-phase line potential to line conductors 5, 6 and 7 initially energizes relay 9 by the application of line potential from conductors 5 and 7 through a circuit which includes the contacts and cores of relay 4. The resulting closure of contact 9a establishes an energizing circuit for contactor relay 10 as hereinbefore set forth. The closure of contacts 10a, 10b and 10c applies the line potential to motor 8 by circuit connections which include coils 1, 2 and 3 as hereinbefore set forth.

The resulting current flow through coils 1, 2 and 3 is ineffective to cause movement of cores 12 and 14 relative central core 13 inasmuch as the windings are so poled that the adjacent cores repulse one another thereby maintaining the cores in the position shown in the drawing.

In the event that there is a line failure at conductor 5, coil 1 is de-energized thereby enabling core 12 to be attracted to central core 13. This operation removes core 12 from contact 21 thereby opening the energizing circuit for relay 9 hereinbefore set forth. The release of contact 9a de-energizes contactor relay 10. This operation causes the release of line contacts 10a, 10b and 10c thereby removing all line phases from motor 8.

The de-energization of coil 2 in response to line failure at conductor 5 effects the release of the previously attracted core 12 whereby this core again assumes the position shown in the drawing. Accordingly, the energizing circuit for the winding of relay 9 is again established thereby placing the system in readiness for applying energy to motor 8 as soon as a three-phase condition is again established.

In the event there is failure in line conductor 6, coil 2 is de-energized thereby effecting the movement of cores 12 and 14 to the right and left, respectively, and in contact with the terminal ends of core 13. This operation de-energizes relays 9 and 10 as hereinbefore set forth removing all line potentials from motor 8.

In the event that there is line failure at conductor 7, core 14 is moved to the left in opposition to spring 20 thereby opening the end contact (not shown) within assembly 24, thereby de-energizing relays 9 and 10 as has been hereinbefore set forth.

It is to be understood that the above-described arrangements are illustrative of the applications of the principles of this invention. Numerous other arrangements may be devised by those skilled in the art without departing from the scope of the invention.

Having thus described my invention, what is claimed as new and desired to be secured by Letters Patent is:

1. A system for completely de-energizing a polyphase load in response to failure of at least a single phase, comprising an electromagnetic relay including an elongated insulating tube having three axially-aligned magnetic cores disposed within the bore of the tube with the central core being rigidly fixed relative the tube and the terminal cores slidable therein, a plurality of resilient separating means each individually interposed between adjacent ends of said cores and electrically connected thereto, a pair of electrical contacts each individually positioned at a different terminal end of said tube and into a contacting relationship with the adjacent core end, three coils enveloping said tube and individually coupled to a different core, means for applying polyphase alternating-current energy to said load including a different coil serially-connected in each phase line so that the resulting energization of said coils causes adjacent core ends to assume like magnetic polarities, and means energized in response to the energization of the circuit from one relay end contact to the other through said cores and said resilient means for maintaining the polyphase energizing circuits for said load, said latter means opening all line phases in response to line failure in at least a single phase which causes one or more of said terminal cores to be at least momentarily attracted to said central core in opposition to said intervening resilient means thereby disconnecting said terminal end contacts one from the other.

2. A system for completely de-energizing a polyphase load in response to failure of at least a single phase, comprising an electromagnetic relay including an elongated insulating tube having three axially-aligned magnetic cores disposed within the bore of the tube with the central core being rigidly fixed relative the tube and the terminal cores slidable therein, a pair of springs each individually interposed between adjacent ends of said cores and electrically connected thereto, a pair of electrical contacts each individually positioned at a different terminal end of said tube and into a contacting relationship with the adjacent core end, three coils enveloping said tube and individually coupled to a different core, means for applying polyphase alternating-current energy to said load including a different coil serially-connected in each phase line so that the resulting energization of said coils causes adjacent core ends to assume like magnetic polarities, and means energized in response to the energization of the circuit from one terminal end contact to the other through said cores and springs for maintaining the polyphase energizing circuits for said load, said latter means opening all line phases in response to line failure in at least a single phase which causes one or more of said terminal cores to be at least momentarily attracted to said central core in opposition to said intervening spring thereby disconnecting said terminal end contacts one from the other.

3. A system for completely de-energizing a polyphase load in response to failure of at least a single phase, comprising an electromagnetic relay including an elongated insulating tube having a plurality of axially-aligned magnetic cores disposed within the bore of the tube with one core being rigidly fixed relative the tube and another core slidable therein, a spring interposed between adjacent ends of said movable and fixed cores and electrically connected thereto, an electrical contact positioned in a contacting relationship with the end of said movable core away from said fixed core, and means establishing an electrical connection to said fixed core, a plurality of coils enveloping said tube and individually coupled to a different core, means for applying polyphase alternating-current energy to said load including a different coil serially-connected in different phase lines so that the resulting energization of said coils causes the adjacent core ends to assume repulsive magnetic polarities, and means energized in response to the energization of a circuit from said contact to said connection means through said cores and spring for maintaining the polpyhase energizing circuits for said load, said latter means opening all line phases in response to line failure in at least a single phase whereby said movable core is at least momentarily attracted to said fixed core in opposition to said intervening spring thereby disconnecting said end contact from said connection means.

4. A system for de-energizing a load in response to failure of at least a single feed line, comprising an electromagnetic relay including an elongated insulating tube having a plurality of magnetic cores disposed within the bore of the tube with the one core being rigidly fixed relative the tube and another core slidable therein, accommodating separation means interposed between adjacent ends of said movable and fixed cores and electrically connected thereto, an electrical contact positioned in a contacting relationship with the end of said movable core away from said fixed core, means establishing an electrical connection to said fixed core, a plurality of coils enveloping said tube and individually coupled to a different core, means for applying line energy to said load including a different coil serially-connected in a different line so that the resulting energization of said coils causes adjacent core ends to assume repulsive magnetic polarities, and means energized in response to the energization of a circuit from said end contact to said connection means through said cores and accommodating means for maintaining the energizing circuits for said load, said latter means opening all the lines in which said coils are connected in response to failure in at least a single line whereby said movable core is at least momentarily attracted to said fixed core in opposition to said intervening accommodating means thereby disconnecting said end contact from said connection means.

5. An electromagnetic relay operable in response to the failure of current in at least a single line out of a group of lines comprising an elongated tube of electrical insulating material having three axially-aligned magnetic cores disposed within the bore of the tube with the central core being rigidly fixed relative the tube and the terminal cores slidable therein, a pair of electrically conductive springs each individually interposed between adjacent ends of said cores and electrically connected thereto, a pair of electrical contacts each individually positioned at a different terminal end of said tube and into a contacting relationsip with the adjacent core end, three coils enveloping said tube and individually coupled to a different core, and means individually connecting each of said coils in a serial connection with a different one of said lines and poling said coils so as to establish repulsive electromagnetic fields between adjacent cores.

6. An electromagnetic relay operable in response to the failure of current in at least a single line out of a group of lines comprising an elongated tube of electrical insulating material having three axially-aligned magnetic cores disposed within the bore of the tube with the central core being rigidly fixed relative the tube and the terminal cores slidable therein, a pair of electrically conductive springs each individually interposed between adjacent ends of said cores and electrically connected thereto, a pair of electrical contacts each individually positioned at a different terminal end of said tube and into a contacting relationship with the adjacent core end, three coils enveloping said tube and individually coupled to a different core, and means individually connecting each of said coils in a serial connection with a different one of said lines and poling said coils so as to establish repulsive electromagnetic fields between adjacent cores whereby current failure in at least a single line causes one of said terminal cores to be attracted to said central core.

7. An electromagnetic relay operable in response to the failure of current in at least a single line out of a group of lines comprising an elongated envelope of electrical insulating material having three axially-aligned magnetic cores disposed within said envelope with the central core being rigidly fixed relative the envelope and the terminal cores slidable therein, a pair of electrically conductive accommodating means each individually interposed between adjacent ends of said cores and electrically connected thereto, a pair of electrical contacts each individually positioned at a different terminal end of said envelope and into a contacting relationship with the adjacent core end, three coils enveloping said envelope and individually coupled to a different core, and means individually connecting each of said coils in a serial connection with a differnet one of said lines and poling said coils so as to establish repulsive electromagnetic fields between adjacent cores.

8. An electromagnetic relay operable in response to the failure of current in at least a single line out of a group of lines comprising three axially-aligned magnetic cores with the central core being rigidly fixed and the terminal cores movable thereto, electrical insulating means for maintaining said cores in alignment and enabling certain of said cores to move along their axis relative to certain other of said cores, means interposed between adjacent cores separating said cores one from the other and establishing a permanent electrical connection therebetween, a pair of electrical contacts each individually positioned at a different terminal end of said series of aligned cores and into a contacting relationship with the adjacent core end, three coils enveloping said cores and individually coupled to a different core, and means individually connecting each of said coils in a serial connection with a different one of said lines and poling said coils so as to establish repulsive electromagnetic fields between adjacent cores.

References Cited in the file of this patent

UNITED STATES PATENTS

| 1,775,658 | Seeger | Sept. 16, 1930 |
| 1,809,827 | Bower | June 16, 1931 |
| 2,749,402 | Tancred | June 5, 1956 |

FOREIGN PATENTS

| 154,327 | Austria | Apr. 15, 1938 |